US009531439B2

(12) United States Patent
Kuo et al.

(10) Patent No.: US 9,531,439 B2
(45) Date of Patent: Dec. 27, 2016

(54) ELECTRONIC DEVICES, NEAR-FIELD WIRELESS COMMUNICATIONS SYSTEM AND METHOD FOR ESTABLISHING A WIRELESS COMMUNICATIONS LINK BETWEEN TWO ELECTRONIC DEVICES

(71) Applicant: MediaTek Inc., Hsin-Chu (TW)

(72) Inventors: Chung-Jen Kuo, Hsin-Chu (TW); Po-An Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 1 day.

(21) Appl. No.: 14/556,520

(22) Filed: Dec. 1, 2014

(65) Prior Publication Data

US 2015/0155916 A1 Jun. 4, 2015

Related U.S. Application Data

(60) Provisional application No. 61/911,522, filed on Dec. 4, 2013.

(30) Foreign Application Priority Data

Nov. 25, 2014 (CN) .......................... 2014 1 0683695

(51) Int. Cl.
*H04B 5/00* (2006.01)
*G06F 3/041* (2006.01)
(Continued)

(52) U.S. Cl.
CPC ............. *H04B 5/0025* (2013.01); *G06F 3/041* (2013.01); *G06F 3/044* (2013.01); *G06F 3/0412* (2013.01); *H04W 76/023* (2013.01)

(58) Field of Classification Search
CPC ......... H04W 4/008; H04B 5/02; H04B 5/0043
See application file for complete search history.

(56) References Cited

U.S. PATENT DOCUMENTS

2001/0002924 A1* 6/2001 Tajima .................. H04B 13/00
375/271
2004/0183788 A1 9/2004 Kurashima et al.
(Continued)

FOREIGN PATENT DOCUMENTS

| CN | 102916729 | 2/2013 |
| CN | 103259569 | 8/2013 |
| EP | 2 244 174 | 10/2010 |

OTHER PUBLICATIONS

English language machine translation of CN 103259569 (published Aug. 21, 2013).

*Primary Examiner* — Cindy Trandai
(74) *Attorney, Agent, or Firm* — McClure, Qualey & Rodack, LLP

(57) ABSTRACT

An electronic device with touch-link functionality includes a touch panel, a signal processing circuit and a controller. The touch panel includes a first transmitting electrode for transmitting a first signal. The signal processing circuit provides the first signal to the first transmitting electrode. The first signal has a first frequency that is adjustable. The controller is coupled to the touch panel and the signal processing circuit. The controller adjusts the first frequency to make the first frequency correspond to an effective communications range. Within the effective communications range, another electronic device with touch-link functionality is able to receive the first signal, whereas outside the effective communications range, the another electronic device with touch-link functionality is unable to receive the first signal.

18 Claims, 10 Drawing Sheets

(51) Int. Cl.
*H04W 76/02* (2009.01)
*G06F 3/044* (2006.01)

(56) References Cited

U.S. PATENT DOCUMENTS

| | | | |
|---|---|---|---|
| 2005/0151907 A1* | 7/2005 | Maeda | G02F 1/1393 349/129 |
| 2008/0076351 A1* | 3/2008 | Washiro | H04B 5/0031 455/41.1 |
| 2008/0117117 A1* | 5/2008 | Washiro | H01Q 1/2225 343/850 |
| 2009/0066998 A1* | 3/2009 | Kato | G01C 21/26 358/1.15 |
| 2009/0251339 A1 | 10/2009 | Naruse | |
| 2010/0176948 A1* | 7/2010 | Garrett | H04B 5/00 340/572.1 |
| 2011/0028091 A1* | 2/2011 | Higgins | H04L 63/0492 455/41.2 |
| 2011/0070827 A1 | 3/2011 | Griffin et al. | |
| 2011/0210941 A1* | 9/2011 | Reynolds | G06F 3/0418 345/174 |
| 2011/0304583 A1* | 12/2011 | Kruglick | G06F 3/044 345/174 |
| 2012/0083222 A1* | 4/2012 | Kawashimo | H04B 5/02 455/68 |
| 2012/0139865 A1 | 6/2012 | Krah et al. | |
| 2013/0127779 A1* | 5/2013 | Lillie | G06F 3/0416 345/174 |
| 2013/0147760 A1 | 6/2013 | Lai et al. | |
| 2013/0221993 A1* | 8/2013 | Ksondzyk | H03K 17/955 324/681 |
| 2013/0231046 A1 | 9/2013 | Pope et al. | |
| 2013/0257804 A1 | 10/2013 | Vu et al. | |
| 2014/0162628 A1* | 6/2014 | Bevelacqua | H04B 17/26 455/423 |
| 2014/0199944 A1 | 7/2014 | Ran et al. | |
| 2014/0340325 A1 | 11/2014 | Fang et al. | |

* cited by examiner

ELECTRONIC DEVICES, NEAR-FIELD WIRELESS COMMUNICATIONS SYSTEM AND METHOD FOR ESTABLISHING A WIRELESS COMMUNICATIONS LINK BETWEEN TWO ELECTRONIC DEVICES

CROSS REFERENCE TO RELATED APPLICATIONS

This application claims the benefit of U.S. Provisional Application No. 61/911,522 filed 2013 Dec. 4 and entitled "Cooperative Communication for Touch Device", and priority of China Patent Application No. 201410683695.8, filed on Nov. 25, 2014, the entire contents of which are hereby incorporated by reference.

BACKGROUND OF THE INVENTION

Field of the Invention

The invention relates to a touch-link electronic device, a near-field wireless communications system and a near-field wireless communications method, and more particularly to an electronic device, a near-field wireless communications system and a near-field wireless communications method that are capable of improving the security of a communications link.

Description of the Related Art

NFC (Near Field Communication) is a contactless identification and interconnection technology, which allows users to intuitively exchange information and access content and services among mobile devices, consumer electronics, personal computers, or intelligent electronic devices using methods of near magnetic field communication, such as using 13.56 MHz of near magnetic field communication.

Since the market demand for integrated NFC in handheld devices such as mobile phones is mature, NFC now supports mobile payment or can act as a point-of-sale (POS) system. However, since NFC is established based on magnetic fields to transmit and receive signals, it is necessary to install inductive card readers or some components with a similar function in handheld devices or mobile phones to support NFC, which causes the handheld devices to become larger and poses a limitation to the layout structure and component material of the mobile phones and other handheld devices.

Along with the development of touch-sense technology, touch-control panel devices have become more and more popular. In one application of touch-sense technology, a touch-control panel device can detect and respond to the contacts of a user. Besides the touch-sense technology, there is the recently developed "touch-link technology" for touch-control panel device, such as that recited in patent applications US 2011/0304583, US 2013/0147760, and CN 102916729A, which implements near-field wireless communications by utilizing the existing touch-control panel and the corresponding hardware devices. Generally, a touch-control panel device includes a touch panel, a signal processing circuit and a central processing unit (CPU). For example, the touch-control panel device may contain a touch pad without display function or a touch screen with display function. The touch-control panel device may include a touch sensor. The touch sensor includes a plurality of driving electrodes and a plurality of sensing electrodes on a substrate. The touch-control panel device is usually implemented by a coating of Indium Tin Oxide (ITO) materials. The signal processing circuit is usually implemented by integrated circuit (IC). The signal processing circuit performs two main functions. One is performing analog-to-digital (ADC) conversion, demodulation, or other signal processing tasks on the analog signals received from the touch panel, and then transmitting the processed signals to the CPU. The other is receiving digital signals from the CPU, performing modulation, digital-to-analog (DAC) conversion, or other signal processing tasks on the received digital signals and then transmitting the processed signals to the touch panel. In an application of touch-sense technology, when a user touches the touch-control panel device with his finger or a stylus, corresponding analog signals are generated by the driving electrodes and sensing electrodes via the touch sensor. The signals are transmitted to the CPU after being processed by the signal processing circuit. The CPU calculates the touch position via proper algorithm(s) and responds to the contacts of the user. In the application of touch-link technology, the driving electrode and/or the sensing electrode can act as a transmitting electrode for transmitting signals, and the driving electrode and/or the sensing electrode can act as a receiving electrode for receiving signals. When transmitting signals, a touch-control panel device can modulate and process the signal to be transmitted by the signal processing circuit, and transmit the processed signals to another touch-control panel device via the transmitting electrode by electric field coupling. The receiving electrode of the another touch-control panel device receives the transmitted signal. When receiving signals, a touch-control panel device can receive a signal via the receiving electrode by electric field coupling, demodulate the signals by the signal processing circuit, and then transmit the processed signal to the CPU for further processing. Therefore, the signals can be transmitted and received by using the original electrodes to realize touch transmission based on electric fields without an inductive card reader or components with a similar function being incorporated. Compared to conventional NFC technology, touch-link technology reduces both volume and cost. Of course, touch-link technology also works when not using the existing hardware such as the existing touch-control panel device, but using another touch-control panel and the signal processing circuit to realize touch-link technology. In addition, in the application of touch-sense technology, there are two common types of touch-control panel devices, capacitive touch and resistive touch. For the applications of touch-link technology, besides the capacitive type of touch-control panel device, the resistive type of touch-control panel device can also be used to realize the touch-link technology.

On the other hand, establishing a communications link, such as the WiFi-Direct or Bluetooth, between two electronic devices have also become more and more popular. For one electronic device, the most common way to establish a communications link is to first search another nearby device, then exchange information regarding the communications link, and finally perform a pairing to establish the communications link. However, in an environment dense with electronic devices, it is inevitable that some irrelevant devices will be found during the search procedure, causing trouble and security problems when establishing the communications link. One of the limitations of using NFC technology completing a WiFi-Direct or Bluetooth pairing is the short distance required, such as 20 cm, yet the 20 cm range is still too far for some scenarios. When the user does not turn off the NFC pairing functionality, intruders can come close to the electronic device and invade the electronic device to steal data with the user unaware.

Therefore, in order to improve the security of such communications link, improved electronic devices and communications methods are proposed. Two electronic devices can not only exchange information for establishing the communications link without using the NFC technology, but also greatly improve the communications security by adjusting the effective distance of the communications.

BRIEF SUMMARY OF THE INVENTION

Electronic devices, a near-field wireless communications system and a method for establishing a wireless communications link between two electronic devices are provided. An exemplary embodiment of an electronic device with touch-link functionality comprises a touch panel, a signal processing circuit and a controller. The touch panel comprises a first transmitting electrode for transmitting a first signal. The signal processing circuit provides the first signal to the first transmitting electrode. The first signal has a first frequency that is adjustable. The controller is coupled to the touch panel and the signal processing circuit. The controller adjusts the first frequency to make the first frequency correspond to an effective communications range. Within the effective communications range, another electronic device with touch-link functionality is able to receive the first signal, whereas outside the effective communications range, the another electronic device with touch-link functionality is unable to receive the first signal.

Another exemplary embodiment of an electronic device with touch-link functionality comprises a touch panel, a signal processing circuit and a controller. The touch panel comprises a first receiving electrode receiving a first signal from another electronic device with touch-link functionality. The first signal has a first frequency that is variable and the first signal corresponds to an effective communications range. The signal processing circuit receives the first signal from the first receiving electrode and demodulates the first signal according to a receiving frequency. The controller is coupled to the touch panel and the signal processing circuit and adjusts the receiving frequency to correspond to the first frequency. Within the effective communications range, the first receiving electrode is able to receive the first signal, whereas outside the effective communications range, the first receiving electrode is unable to receive the first signal.

An exemplary embodiment of a method for establishing a wireless communications link between two electronic devices comprises: setting an effective communications range, wherein within the effective communications range, a first electronic device is able to wirelessly communicate with the another electronic device with a touch panel by transmitting a first signal, whereas outside the effective communications range, the first electronic device is unable to wirelessly communicate with the another electronic device; determining a frequency of the first signal according to the effective communications range, wherein the frequency of the first signal is adjustable; transmitting the first signal by the first electronic device via a touch panel of the first electronic device; receiving the first signal by a second electronic device within the effective communications range via a touch panel of the second electronic device; and demodulating the first signal by the second electronic device according to a receiving frequency, wherein the receiving frequency is adjustable.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
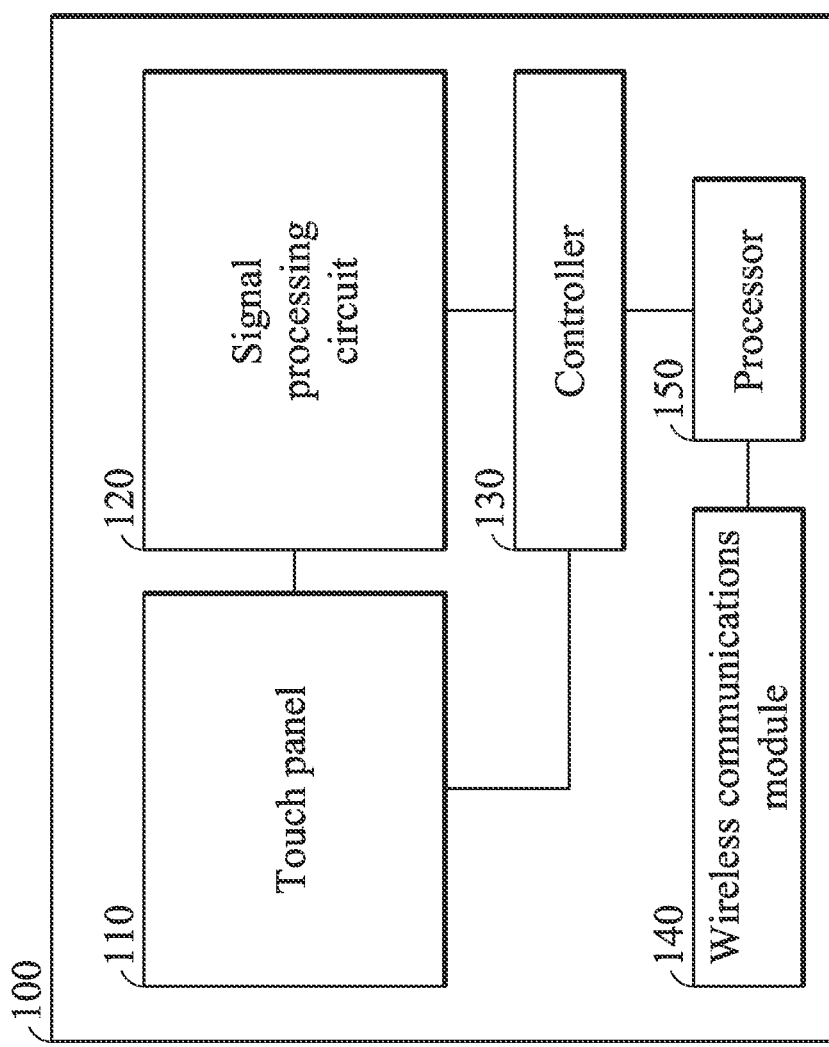
FIG. 1 is a block diagram of an electronic device according to an embodiment of the invention.

FIG. 1 is a block diagram of an electronic device according to an embodiment of the invention. According to an embodiment of the invention, the electronic device 100 may comprise a touch panel 110, a signal processing circuit 120, a controller 130, a wireless communications module 140 and a processor 150. The touch panel 110 detects the touch events thereon and receives or transmits signals. The signal processing circuit 120 processes the signals received from the touch panel 110 or the processor 150. The controller 130 is coupled to the touch panel 110 and the signal processing circuit 120 and controls operations of the touch panel 110 and the signal processing circuit 120. The wireless communications module provides wireless communications functionality to facilitate the electronic device 100 to establish a wireless communications link, such as a WiFi or a Bluetooth communications link, in accordance with a predetermined communications protocol with another electronic device. The processor 150 is coupled to the controller 130 and the wireless communications module 140 and controls operations of the controller 130 and the wireless communications module 140.

According to an embodiment of the invention, the electronic device 100 may be a mobile communications device or a handheld electronic device. For example, the electronic device 100 may be a cellular phone, a tablet computer, a multimedia player, a personal digital assistant, a Global Positioning System (GPS) receiver, a wearing device, or other electronic device. The touch panel 110 and the signal processing circuit 120 may as a whole be regarded as a touch-control module. The processor 150 may be the main processor of the electronic device 100, such as a microprocessor or a central processing unit. The wireless communications module 140 may be, for example, a Bluetooth communications module, a WiFi communications module, a GPS communications module, or another such module.

Note that in order to clarify the concept and simplify the descriptions of the invention, FIG. 1 presents a simplified block diagram, in which only the elements relevant to the invention are shown. However, note that the invention should not be limited what is shown in FIG. 1. For example, the electronic device 100 may comprise more than one wireless communications module and/or another functional module.

According to an embodiment of the invention, the electronic device 100 may comprise at least a transmitting electrode. The transmitting electrode may be a portion of the touch panel 110 of the electronic device 100, or it may be an independent unit outside of the touch panel 110. Based on the touch-link technology, the transmitting electrode transmits a first signal. The signal processing circuit 120 of the electronic device 100 provides the first signal to the first transmitting electrode. The first signal may have a first frequency that is adjustable. In addition, the touch panel 110 may comprise some conductive traces, wherein at least one conductive trace is coupled to the signal processing circuit 120.

According to another embodiment of the invention, the electronic device 100 may comprise at least one receiving electrode. The receiving electrode may be a portion of the touch panel 110 of the electronic device 100, or it may be an independent unit outside of the touch panel 110. Based on the touch-link technology, the receiving electrode receives a second signal. The signal processing circuit 120 of the electronic device 100 receives the second signal from the receiving electrode and demodulates the second signal according to a receiving frequency. The second signal may have a second frequency that is variable. In addition, the touch panel 110 may comprise some conductive traces, wherein at least one conductive trace is coupled to the signal processing circuit 120.

According to yet another embodiment of the invention, the electronic device 100 may comprise at least a receiving electrode and at least a transmitting electrode. The transmitting electrode and the receiving electrode may be a portion of the touch panel 110 of the electronic device 100, or it may be an independent unit outside of the touch panel 110. The signal processing circuit 120 of the electronic device 100 modulates a first signal. The transmitting electrode transmits the first signal and the receiving electrode receives a second signal. The signal processing circuit 120 demodulates the second signal. The frequencies of the first signal and the second signal are variable. In addition, the touch panel 110 may comprise some conductive traces, wherein at least one conductive trace is coupled to the transmitting electrode and at least one conductive trace is coupled to the receiving electrode, such that the transmitting electrode and the receiving electrode are electrically connected to the touch panel 110.

Figure 2A:
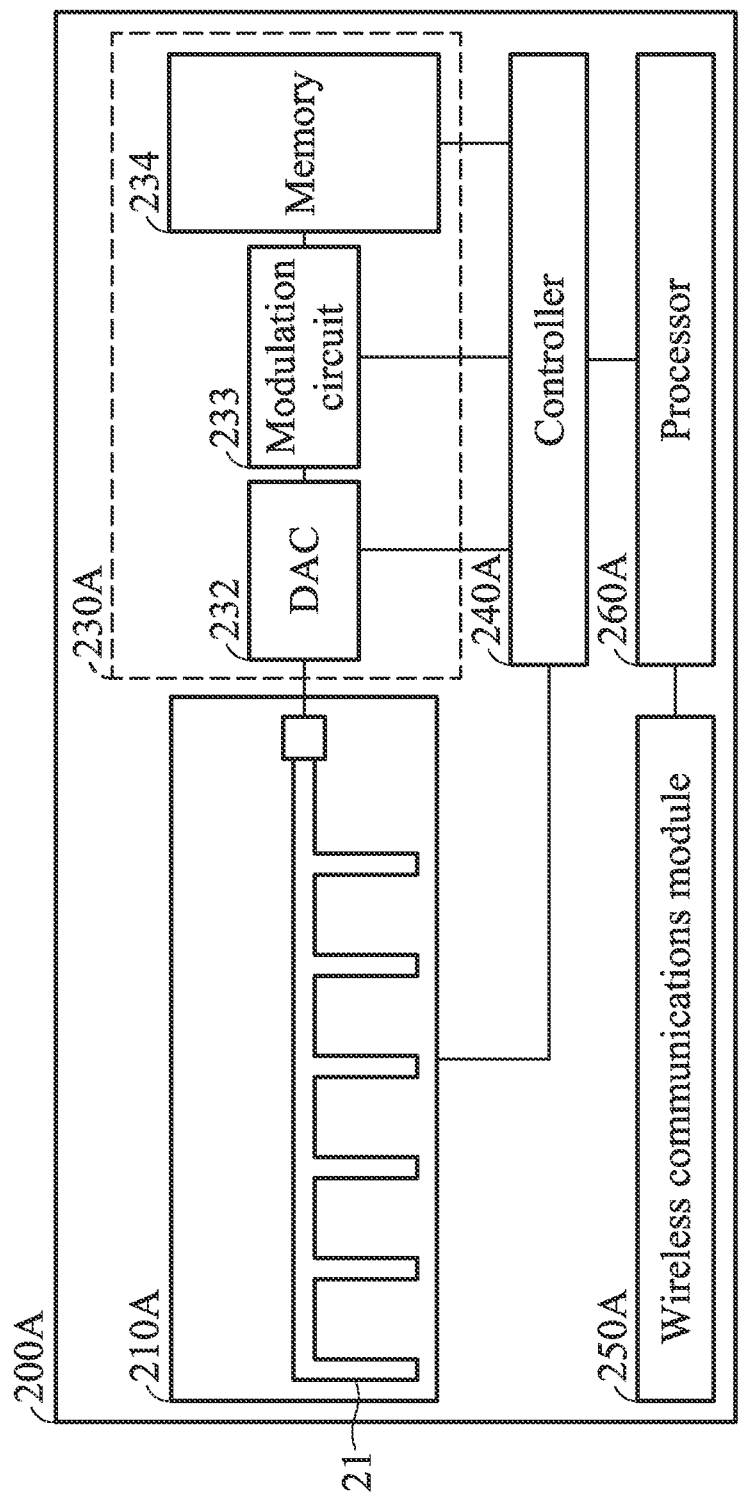
FIG. 2A is a block diagram of an electronic device according to another embodiment of the invention.

FIG. 2A is a block diagram of an electronic device according to another embodiment of the invention. The electronic device 200A may at least comprise a touch panel 210A, a transmitting electrode 21, a signal processing circuit 230A, a controller 240A, a wireless communications module 250A and a processor 260A. The elements comprised in the electronic device 200A are substantially the same as those in the electronic device 100. Therefore, descriptions regarding the touch panel 210A, the controller 240A, the wireless communications module 250A and the processor 260A may refer to the descriptions of FIG. 1, and are omitted herein for brevity.

According to an embodiment of the invention, the transmitting electrode 21 may be the trace or conductive line laid on the touch panel 210A for transmitting a first signal based on the touch-link technology. The signal processing circuit 230A may comprise a digital-to-analog converter (DAC) 232, a modulation circuit 233 and a memory 234. The signal processing circuit 230A provides the first signal to the transmitting electrode 21. The first signal has a first frequency that is adjustable, and the first signal corresponds to an effective communications range according to the first frequency. Here, "corresponding to an effective communications range according to the first frequency" means that a distance that the first signal is reachable varying with the first frequency. To be more specific, if the electronic device 200A would like to transmit the first signal to another electronic device, the distance between the electronic device 200A and the another electronic device has to be shorter than the effective communications range. The signal processing circuit 230A modulates the first signal according to the first frequency and provides the first signal to the transmitting electrode 21. The memory 234 stores data (which will be transmitted later). The modulation circuit 233 modulates the data according to the first frequency to generate the first signal. The DAC 230 converts the first signal from a digital signal to an analog signal. The signal processing circuit may further comprise a filter circuit (not shown) to amplify or filter the analog first signal and then transmit the first signal to the transmitting electrode 21. Finally, the first signal is transmitted out via the transmitting electrode 21. The controller 240A may determine the value of the first frequency and control the modulation circuit 233 to adjust the first frequency.

Figure 2B:
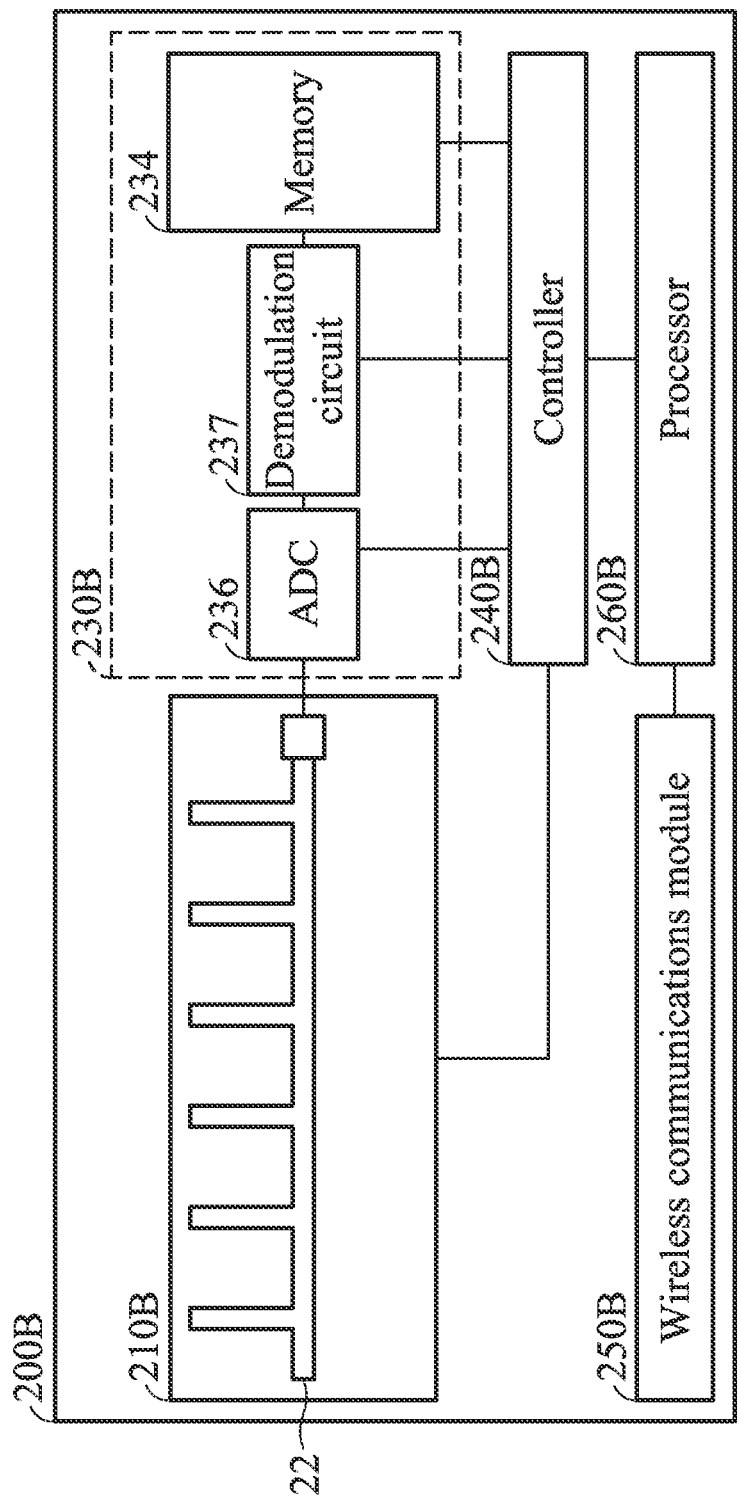
FIG. 2B is a block diagram of an electronic device according to another embodiment of the invention.

FIG. 2B is a block diagram of an electronic device according to another embodiment of the invention. The electronic device 200B may at least comprise a touch panel 210B, a receiving electrode 22, a signal processing circuit 230B, a controller 240B, a wireless communications module 250B, and a processor 260B. The elements comprised in the electronic device 200B are substantially the same as those in the electronic device 100. Therefore, descriptions regarding the touch panel 210B, the controller 240B, the wireless communications module 250B and the processor 260B may refer to the descriptions of FIG. 1, and are omitted herein for brevity.

According to an embodiment of the invention, the receiving electrode 22 may be the trace or conductive line laid on the touch panel 210B for receiving a second signal based on the touch-link technology. The second signal has a second frequency that is variable, and the second signal corresponds to an effective communications range according to the second frequency. Here, "corresponding to an effective communications range according to the second frequency" means that a distance that the second signal is reachable varying with the second frequency. To be more specific, if the electronic device 200B would like to receive the second signal from another electronic device, a distance between the electronic device 200B and the another electronic device has to be shorter than the effective communications range. The signal processing circuit 230B receives the second signal from the receiving electrode 22 and demodulates the second signal according to a receiving frequency. To be more specific, the signal processing circuit 230B may comprise an analog-to-digital converter (ADC) 236, a demodulation circuit 237 and a memory 234. The ADC 360 receives the second signal from the receiving electrode 22 and converts the second signal from an analog signal to a digital signal. The demodulation circuit 237 demodulates the second signal according to the receiving frequency. The memory 234 stores the demodulated second signal. The signal processing circuit may further comprise a filter circuit (not shown) to amplify or filter the second signal and then transmit the second signal to the ADC 236.

Figure 2C:
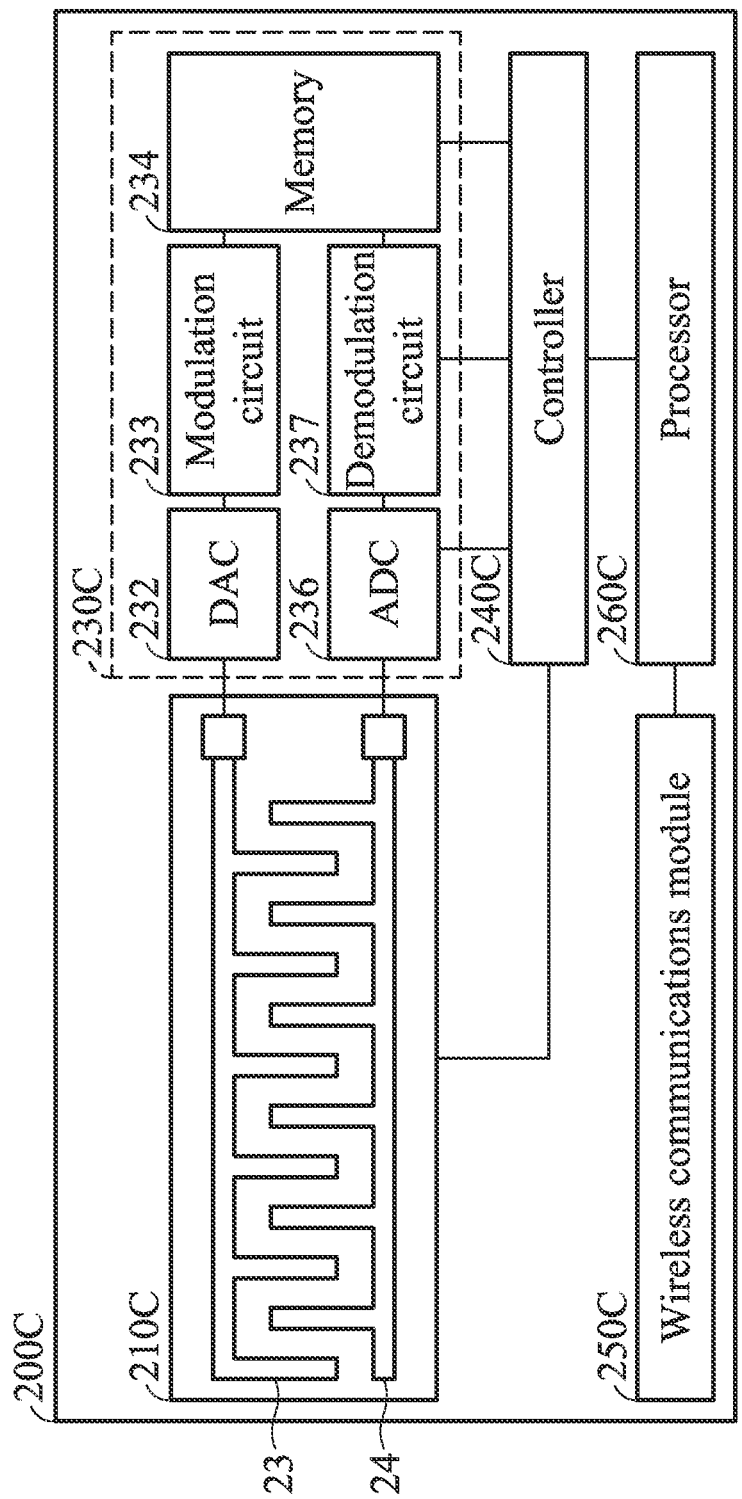
FIG. 2C is a block diagram of an electronic device according to another embodiment of the invention.

FIG. 2C is a block diagram of an electronic device according to another embodiment of the invention. The electronic device 200C may at least comprise a touch panel 210C, a transmitting electrode 23, a receiving electrode 24, a signal processing circuit 230C, a controller 240C, a wireless communications module 250C and a processor 260C. The elements comprised in the electronic device 200C are substantially the same as those in the electronic device 100. Therefore, descriptions regarding the touch panel 210C, the controller 240C, the wireless communications module 250C and the processor 260C may refer to the descriptions of FIG. 1, and are omitted herein for brevity.

According to an embodiment of the invention, the transmitting electrode 23 and the receiving electrode 24 may be the traces or conductive lines laid on the touch panel 210C. The transmitting electrode 23 transmits a first signal and the receiving electrode 24 receives a second signal based on the touch-link technology. The signal processing circuit 230C may comprise a digital-to-analog converter (DAC) 232, a modulation circuit 233, a memory 234, an analog-to-digital converter (ADC) 236 and a demodulation circuit 237. Descriptions regarding the DAC 232, the modulation circuit 233, the memory 234, the ADC 236 and the demodulation circuit 237, reference may be made to the descriptions of FIG. 2A and FIG. 2B, and are omitted here for brevity. Note that, in the embodiments of the invention, the transmitting electrode 23 and the receiving electrode 24 may be further utilized for detecting touch events on the touch panel 210C.

Figure 2D:
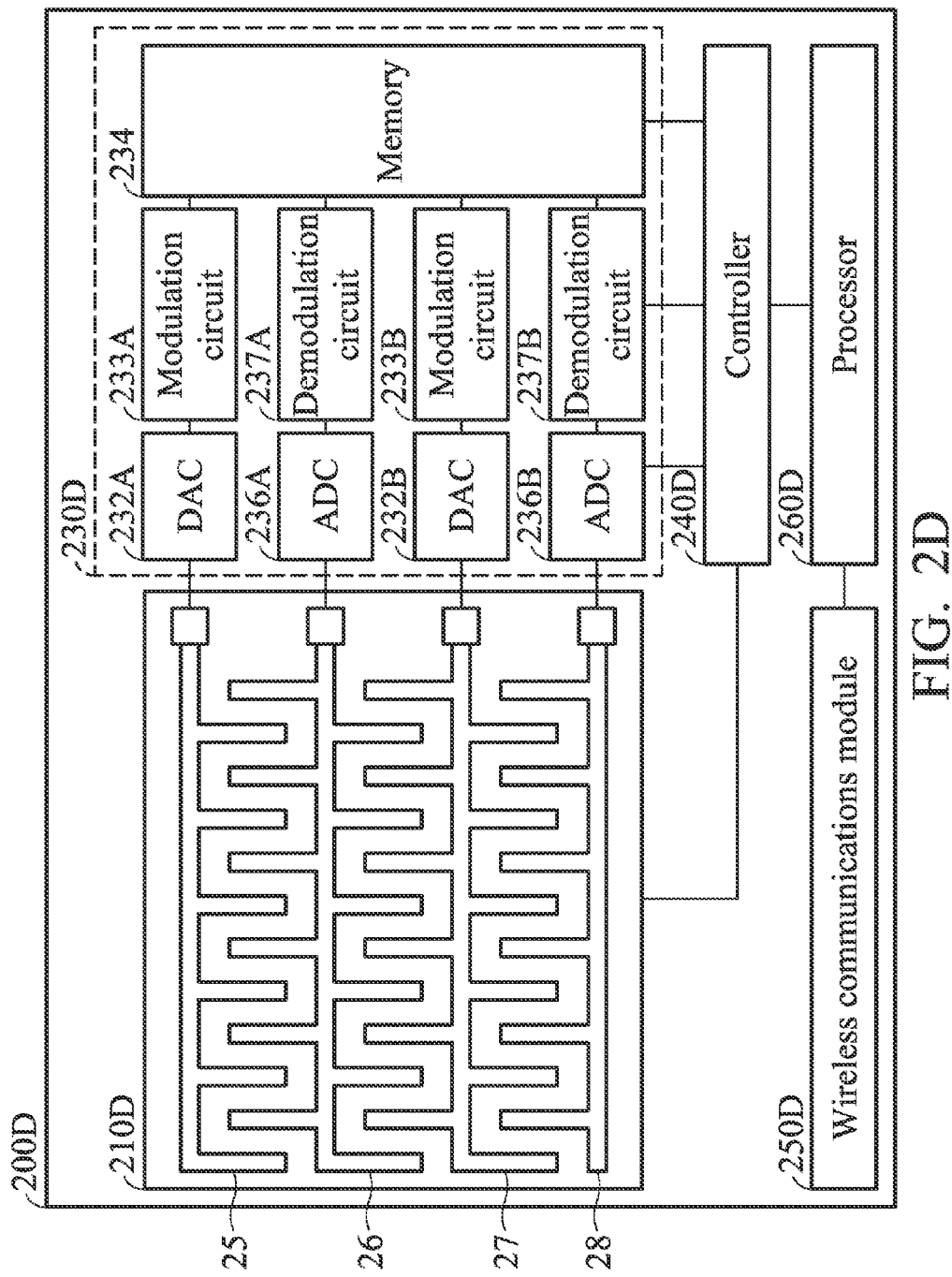
FIG. 2D is a block diagram of an electronic device according to another embodiment of the invention.

FIG. 2D is a block diagram of an electronic device according to another embodiment of the invention. The electronic device 200D may at least comprise a touch panel 210D, transmitting electrodes 25 and 27, receiving electrodes 26 and 28, a signal processing circuit 230D, a controller 240D, a wireless communications module 250D and a processor 260D. The elements comprised in the electronic device 200D are substantially the same as those in the electronic device 100. Therefore, descriptions regarding the touch panel 210D, the controller 240D, the wireless communications module 250D and the processor 260D may refer to the descriptions of FIG. 1, and are omitted herein for brevity.

In the embodiment, the electronic device 200D may comprise more than one transmitting electrode and more than one receiving electrode. The transmitting electrodes 25 and 27 may be the traces or conductive lines laid on the touch panel 210D, and the receiving electrodes 26 and 28 may be the traces or conductive lines laid on the touch panel 210D. The signal processing circuit 230D may comprise DACs 232A and 232B, modulation circuits 233A and 233B, a memory 234, ADCs 236A and 236B and demodulation circuits 237A and 237B. For simplicity, for the descriptions regarding the DACs 232A and 232B, the modulation circuits 233A and 233B, the memory 234, the ADCs 236A and 236B and the demodulation circuits 237A and 237B, reference may be made to the descriptions of FIG. 2A and FIG. 2B, and are omitted here for brevity.

Note that the layouts, the numbers, and the structures of the transmitting electrodes and receiving electrodes, as well as those of the transmitting circuits and the receiving circuits shown in FIGS. 2A-2D, are just some of a variety of embodiments of the invention, and the invention should not be limited to what is shown in FIGS. 2A-2D.

Figure 3:
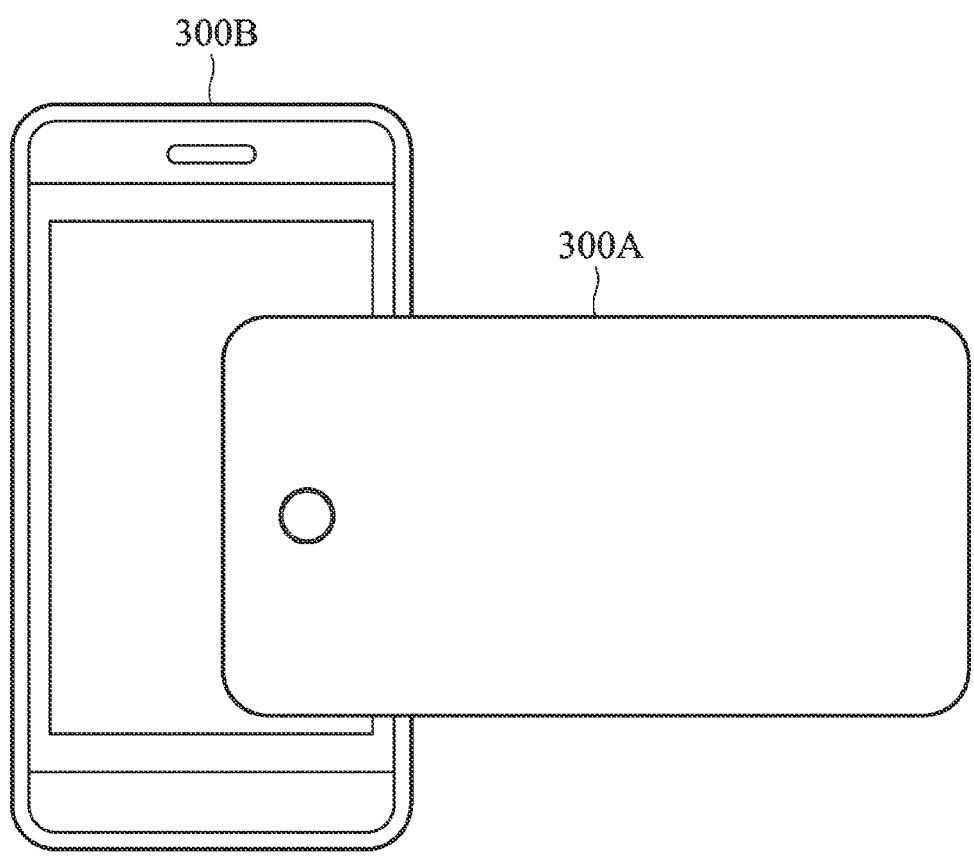
FIG. 3 shows an exemplary near-field wireless communications system according to an embodiment of the invention.

FIG. 3 shows an exemplary near-field wireless communications system according to an embodiment of the invention. According to an embodiment of the invention, the near-field wireless communications system may comprise at least two electronic devices 300A and 300B. The electronic device 300A may comprise at least a transmitting electrode. For example, electronic device 300A may be the electronic device shown in FIG. 1, FIG. 2A, FIG. 2C and FIG. 2D, but the invention is not limited thereto. The electronic device 300B may comprise at least a receiving electrode. For example, the electronic device 300B may be the electronic device shown in FIG. 1, FIG. 2B, FIG. 2C and FIG. 2D, but the invention is not limited thereto. According to an embodiment of the invention, the effective communications range of two electronic devices may be varied by adequately adjusting the frequencies of the signals transmitted and received therebetween. In this manner, the security of communications between these two electronic devices may be greatly improved. According to an embodiment of the invention, the effective communications range may be a reachable range or the distance of a wireless communications link established between these two electronic devices via the equipped transmitting electrodes and receiving electrodes, or a reachable range or distance for data transmission between these two electronic devices by directly using the equipped transmitting electrodes and receiving electrodes. The proposed electronic devices, communications system and communications methods are further discussed in the following paragraphs.

According to an embodiment of the invention, the controller (such as the controller 130, 240A, 240B, 240C or 240D) may control the modulator to adjust the transmitting frequency for modulating the transmitting signal according to the effective communications range, or control the demodulator to adjust the receiving frequency for demodulating the received signal according to the effective communications range. In this manner, the two electronic devices (for example, electronic devices 300A and 300B) located within the effective communications range may perform wireless communications via the equipped transmitting electrode and the receiving electrode (such as the transmitting circuit and receiving circuit shown in FIG. 2A-2D). In the embodiments of the invention, the ways for two electronic devices to perform wireless communications may comprise directly using the equipped transmitting electrode and receiving electrode to transmit data, or using the equipped transmitting electrode and receiving electrode to establish a wireless communications link, and then using the wireless communications link to transmit data. Note that in the embodiments of the invention, by adequately controlling the transmitting frequency, the receiving frequency and the strength of the electric field, two electronic devices are unable to perform wireless communications beyond the effective communications range.

For example, the transmitting electrode of the electronic device 300A may transmit a first signal at a first frequency. When the electronic device 300A transmits the first signal, an electric field is generated accordingly on the touch panel of the electronic device 300A. The strength of the electric field may correspond to a first effective communications range. When the distance between the electronic devices 300A and 300B exceeds the first effective communications range, the first signal is unable to be transmitted to the electronic device 300B, or the electronic device 300B is unable to correctly demodulate the first signal.

On the other hand, the transmitting electrode of the electronic device 300A may also transmit a second signal at a second frequency that is different from the first frequency. While the electronic device 300A is transmitting the second signal, an electric field is generated accordingly on the touch panel of the electronic device 300A. The strength of the electric field may correspond to a second effective communications range, and the second signal corresponds to the second effective communications range. When the distance between the electronic devices 300A and 300B exceeds the second effective communications range, the second signal is unable to be transmitted to the electronic device 300B, or the electronic device 300B is unable to correctly demodulate the second signal.

Since the first frequency and the second frequency are different, the first effective communications range and the second effective communications range may be different. Therefore, the processor (such as the processor 150, 260A, 260B, 260C or 260D) or the controller (such as the controller 130, 240A, 240B, 240C or 240D) may determine the adequate transmitting frequency and receiving frequency according to different requirements of the effective communications range and/or of the electric field strength, and respectively control the modulation circuit and demodulation circuit, such that the security of the communications between the electronic device 300A and 300B may be controlled effectively. In brief, the effective communications range varies with the transmitting frequency and the receiving frequency of the signal change.

Figure 4:
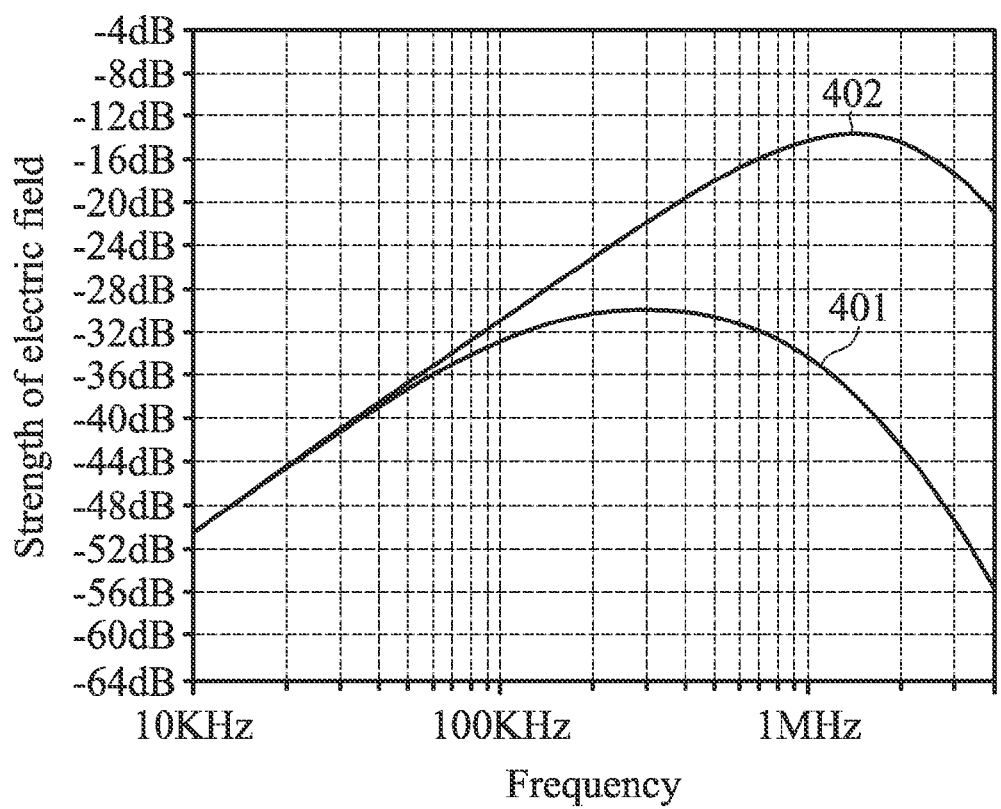
FIG. 4 is an exemplary diagram showing the relationship between the strength of the electric fields generated by the touch panels on different devices and the transmitting frequency according to an embodiment of the invention.

FIG. 4 is an exemplary diagram showing the relationship between the strength of the electric fields generated by the touch panels on different devices and the transmitting frequency according to an embodiment of the invention. The curves 401 and 402 are the curves showing the relationship between the strength of the electric fields generated based on the channel responses of the touch panels on different electronic devices and the transmitting frequencies. Since the strength of the electric field corresponds to the transmission range, the processor (such as the processor 150, 260A, 260B, 260C or 260D) may determine an adequate transmitting frequency and receiving frequency of the signal according to the requirements of the effective communications range and/or the electric field strength.

Referring back to FIG. 3, according to an embodiment of the invention, the controller (such as the controller 130, 240A, 240B, 240C or 240D) of the electronic device 300A may directly transmit data or transmit information for establishing a wireless communications link to the electronic device 300B via the transmitting electrode. In this manner, a single-directional (for example, from the electronic device 300A to the electronic device 300B) or a bi-directional data transmission can be performed between the electronic devices 300A and 300B, or a wireless communications link can be established between these two electronic devices for subsequent data transmission.

For example, when size or data rate of data is smaller than or equal to a threshold value, the electronic device 300A may transmit the data directly to the electronic device 300B via its transmitting electrode. In this manner, the electronic device 300B may directly receive the data via its receiving electrode. In other words, in the embodiments of the invention, the electronic devices 300A and 300B may perform data transmission directly via the transmitting electrode and the receiving electrode on the corresponding touch panel.

On the other hand, when the size or data rate of the data exceeds the threshold value, the electronic device 300A may transmit information for establishing a wireless communications link to the electronic device 300B via its transmitting electrode, or the electronic device 300B may transmit information for establishing a wireless communications link to the electronic device 300A via its transmitting electrode. Here, the information for establishing a wireless communications link may comprise a user name, a password, a network address, or settings for each kind of communications protocol, or others. In this manner, the wireless communications module (such as the wireless communications module 140, 250A, 250B, 250C or 250D) equipped in the electronic devices 300A and 300B may establish a wireless communications link between these two electronic devices according to the information, and subsequent data transmission or exchange may further be performed via the wireless communications link. In other words, in the embodiments of the invention, a wireless communications link can be established automatically between the electronic devices 300A and 300B without the requirement for a manual setting by the user, and the subsequent data transmission or exchange can be performed via the wireless communications link.

Figure 5:
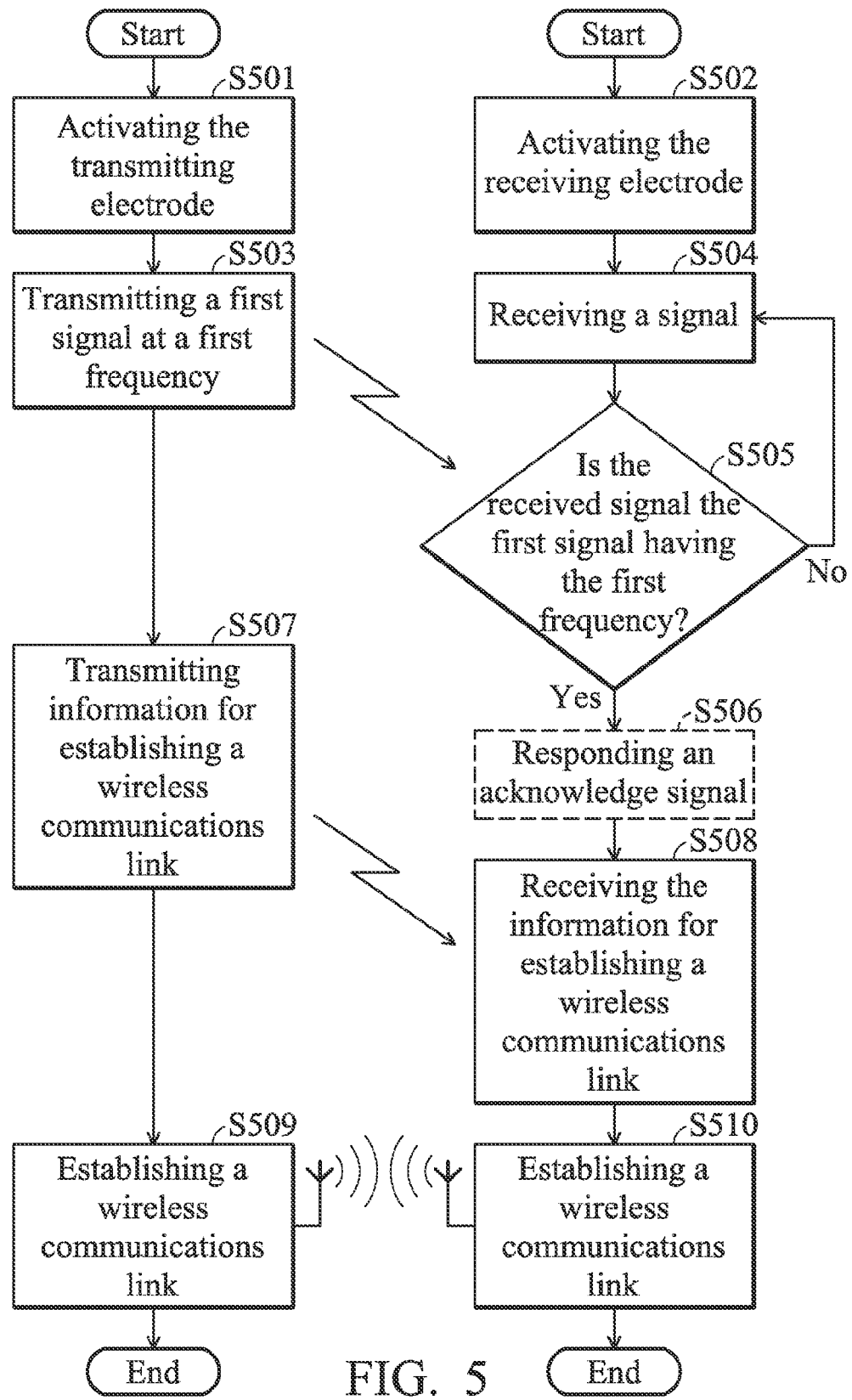
FIG. 5 is a flow chart of near-field wireless communications according to an embodiment of the invention.

FIG. 5 is a flow chart of near-field wireless communications according to an embodiment of the invention. The left-hand side of the flow chart shows the steps performed by a first electronic device (such as the electronic device 300A) and the right-hand side of the flow chart shows the steps performed by the second electronic device (such as the electronic device 300B). First of all, the first electronic device activates its transmitting electrode in step S501 and the second electronic device activates its receiving electrode in step S502. Next, the first electronic device transmits a first signal at a first frequency in step S503. The second electronic device receives a signal via its receiving electrode in step S504 and determines whether the frequency of the received signal is the first frequency in step S505. If not, the second electronic device continuous waiting to receive the first signal having the first frequency in steps S504 and S505. If so, the second electronic device selectively (marked by the dotted line) responds to the first electronic device with an acknowledge signal in step S506.

Next, the first electronic device transmits information for establishing a wireless communications link to the second electronic device in step S507, and the second electronic device receives the information for establishing a wireless communications link in step S508. Note that the transmission and reception of the first signal and the information for establishing a wireless communications link are performed via the transmitting electrode and the receiving electrode on the touch panel equipped in the first electronic device and the second electronic device. Finally, the first electronic device and the second electronic device further establish the wireless communications link via the equipped wireless communications modules and start wireless communications therebetween in steps S509 and S510.

According to an embodiment of the invention, the first electronic device and the second electronic device may determine the frequency utilized for transmitting the data or information in advance. For example, the first frequency in steps S503-S505 is determined before transmitting the first signal. For example, the controller (such as the controller 130, 240A, 240B, 240C or 240D) of the electronic device 300A may control the corresponding signal processing circuit to modulate a test signal according to one or more different test frequencies in a test phase and then transmit the modulated test signal in turn. After receiving the test signal, the controller (such as the controller 130, 240A, 240B, 240C or 240D) of the electronic device 300B may control the corresponding signal processing circuit to demodulate the test signal according to one or more different test frequencies and select one or more preferred frequencies from the plurality of different test frequencies according to the demodulation results, the strength of the test signal or interference experienced by the test signal. Next, the electronic device 300B may respond to the electronic device 300A with information regarding the one or more preferred frequencies. In the embodiments of the invention, information regarding the one or more preferred frequencies may comprise a suggested frequency to be used. In addition, in the embodiments of the invention, information regarding the one or more preferred frequencies may be transmitted between two electronic devices via specific encoding methods.

After receiving the information regarding the one or more preferred frequencies, the electronic device 300A may select at least one for use as the first frequency. Note that when, the electronic device 300A selects more than one preferred frequency as the first frequency, the electronic device 300A may transmit the first signal at the preferred frequencies in turn, or it may simultaneously transmit the first signal at the preferred frequencies. For example, when the electronic device 300A is equipped with more than one transmitting electrode as shown in FIG. 2D, the transmitting electrodes may be utilized to transmit the first signal at different frequencies. The electronic device 300B may receive the first signal via its receiving electrode(s), and demodulate the received first signal according to different frequencies in turn, or demodulate the received first signal according to the preferred frequencies simultaneously. For example, when the electronic device 300B is equipped with more than one receiving electrode as shown in FIG. 2D, the signal processing circuit 230D may demodulate the received first signal according to different frequencies.

Besides the test phase, the electronic device 300A may also determine the first frequency in a correction phase via a correction procedure. For example, the controller (such as the controller 130, 240A, 240B, 240C or 240D) of the electronic device 300A may control the corresponding signal processing circuit to modulate another test signal according to one or more different frequencies in a correction phase, and transmit the another test signal modulated at different frequencies in turn via a transmitting electrode. Next, a receiving electrode of the electronic device may receive the another test signal and obtain a curve of the strength of the electric field versus the frequency as shown in FIG. 4. Next, the electronic device 300A may select one or more preferred frequencies according to the curve as the first frequency.

Note that the described above test phase and correction phase may also be initiated by the electronic device 300B, and the invention should not be limited to any specific method of implementation.

In addition, according to an embodiment of the invention, when the electronic device is equipped with more than one transmitting electrode as shown in FIG. 2D, the controller (such as the controller 130, 240A, 240B, 240C or 240D) may selectively activate one or more transmitting electrodes, or activate all the transmitting electrodes at the same time based on system requirements. In other words, whether to use the transmitting electrodes or not can be flexibly adjusted. Similarly, when the electronic device is equipped with more than one receiving electrode as shown in FIG. 2D, the controller (such as the controller 130, 240A, 240B, 240C or 240D) may selectively activate one or more receiving electrodes, or activate all the receiving electrodes at the same time based on system requirements. In other words, whether to use the receiving electrodes or not can be adjusted flexibly.

In addition, as discussed above, since a wireless communications link can be established automatically between two electronic devices 300A and 300B without the requirement of manually setting by the users and the subsequent data transmission or exchange can be performed via the wireless communications link, in some embodiments of the invention, the electronic devices 300A and 300B may further generate a feedback signal to the user to inform the user of the current status. For example, the electronic devices 300A and 300B may generate a sound or a vibration, after the data transmission or after the wireless communications link establishment is completed, to notify the user of this event. In the embodiments of the invention, by setting the effective communications range, signal and data transmission can only be performed when the two electronic devices are placed within the effective communications range. Therefore, under some kind of high security requirement, signal and data transmission can only be performed when the two electronic devices are placed so close as "one panel touching the other". In this manner, when the user hears the sound or feels the vibration, the user knows that the two electronic devices can be separated.

According to an embodiment of the invention, the signal transmission between two electronic devices can be performed via a human body, but the invention should not be limited thereto. For example, a user may touch the electronic device 300A with one hand and touch the electronic device 300B with the other hand. For another example, an user may touch the electronic device 300A with one finger and touch the electronic device 300B by with another finger. In this manner, the signal or electric field transmitted by the transmitting electrode of one electronic device may be passed to another electronic device via the human body, and then be received by the receiving electrode of another electronic device.

Figure 6:
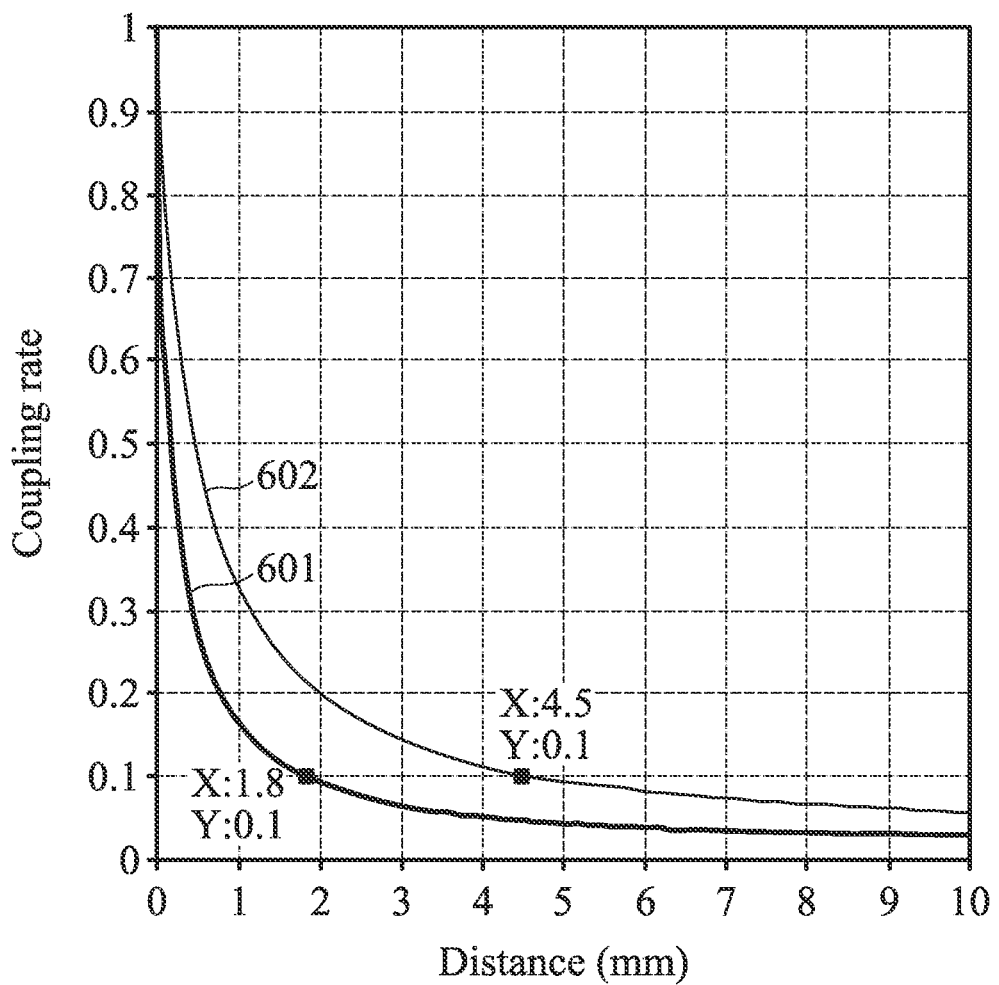
FIG. 6 is an exemplary diagram showing the relationship between the coupling rate and a distance between two devices according to an embodiment of the invention.

According to another embodiment of the invention, in addition to be able to adjust the effective communications range by adjusting the frequency of the signal or the strength of the electric field, the effective communications range can also be adjusted by adjusting the dielectric constant of the touch panel. FIG. 6 is an exemplary diagram showing the relationship between the coupling rate and the distance between the two devices according to an embodiment of the invention. In FIG. 6, the X-axis represents the distance between the two devices and the Y-axis represents the coupling rate. The coupling rate is a ratio of the strength of the electric field generated between the touch panels of the two electronic devices to the strength of the electric field generated between the touch panels of the two electronic devices when the touch panel of one of the electronic devices is in physical contact with the touch panel of the other electronic device. Therefore, the coupling rate is a value distributed between 0 and 1. The curve 601 shows the relationship between the coupling rate and the distance when the dielectric constant of the touch panel $\in=10$ and the curve 602 shows the relationship between the coupling rate and the distance when the dielectric constant of the touch panel $\in=4$. As show in FIG. 6, when the dielectric constants of the touch panels of the two electronic devices are $\in=10$, as long as distance between these two electronic devices is greater than 1.8 mm, the coupling rate is smaller than 0.1. When the dielectric constants of the touch panels of the two electronic devices are $\in=4$, as long as a distance between these two electronic devices is greater than 4.5 mm, the coupling rate is smaller than 0.1. The coupling rate being greater than 0.1 means that signal transmission can be performed effectively between two electronic devices. In other words, when the dielectric constants of the touch panels of the two electronic devices are ∈=10, the effective communications range is 1.8 mm, and when the dielectric constants of the touch panels of the two electronic devices are ∈=4, the effective communications range is 4.5 mm. It can be observed from the above examples that a dielectric constant of ∈=10 is suitable for an electronic device that requires higher communications security, whereas a dielectric constant of ∈=4 is suitable for an electronic device that requires lower communications security. Therefore, the effective communications range can be adjusted by adequately designing the dielectric constant at the design stage of the touch panel.

Figure 7:
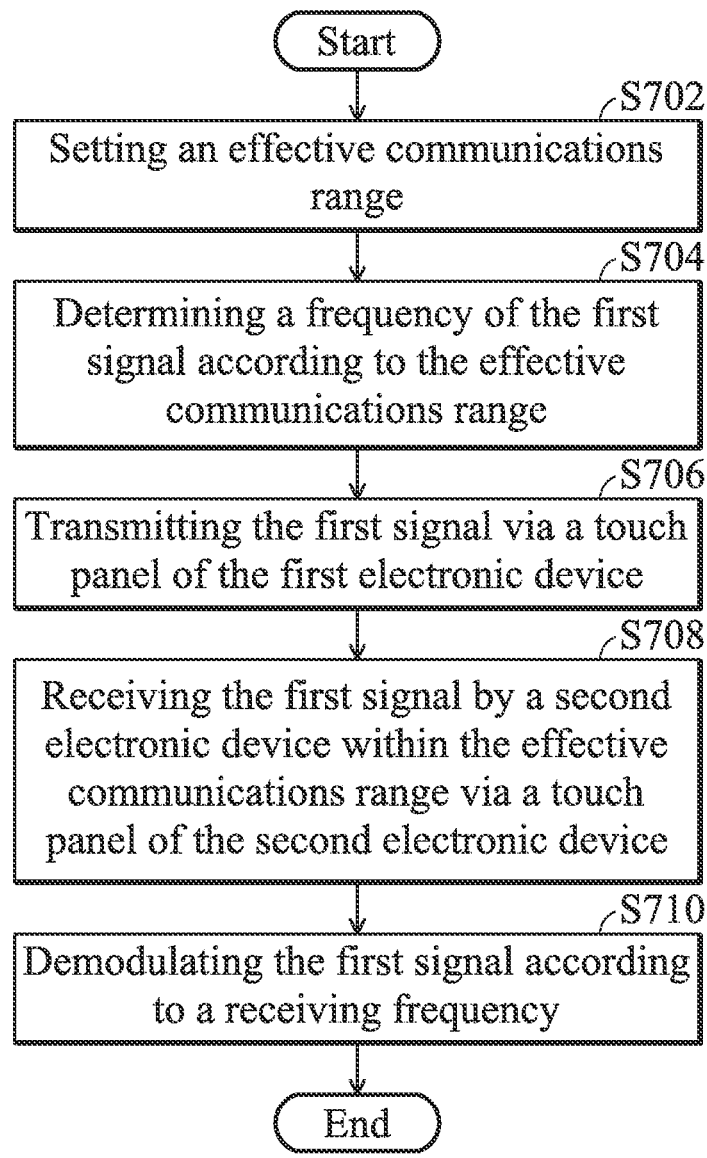
FIG. 7 is a flow chart of a method for establishing a near-field wireless communications between two electronic devices according to an embodiment of the invention.

FIG. 7 is a flow chart of a method for establishing a near-field wireless communications between two electronic devices according to an embodiment of the invention. First of all, the processor (such as the processor 150, 260A, 260B, 260C or 260D) or the controller (such as the controller 130, 240A, 240B, 240C or 240D) of a first electronic device may set an effective communications range (Step S702). Within the effective communications range, the first electronic device is able to wirelessly communicate with a second electronic device by transmitting a first signal, whereas outside the effective communications range, the first electronic device is unable to wirelessly communicate with the second electronic device. Next, the processor (such as the processor 150, 260A, 260B, 260C or 260D) or the controller (such as the controller 130, 240A, 240B, 240C or 240D) of the first electronic device may determine a frequency of the first signal according to the effective communications range (Step S704). The frequency of the first signal is adjustable. Next, the first signal is transmitted via a touch panel of the first electronic device (Step S706). Next, the second electronic device within the effective communications range may receive the first signal via a touch panel of the second electronic device (Step S708). Finally, the second electronic device demodulates the first signal according to a receiving frequency (Step S710). The receiving frequency is adjustable.

As discussed above, the first signal may be transmitted from the first electronic device to the second electronic device through the human body. In addition, as discussed above, data or information for establishing a wireless communications link may be transmitted from the first electronic device to the second electronic device via the first signal. The first electronic device and the second electronic device may establish a wireless communications link therebetween according to the information, and perform subsequent data transmission or exchange via the wireless communications link.

In addition, as discussed above, besides adjusting the transmitting frequency or the receiving frequency of the signal, or by adjusting the strength of the electric field to change the effective communications range, in other embodiments of the invention, the effective communications range may also be changed by adequately designing the dielectric constant at the design stage of the touch panel.

In the embodiments of the invention, near-field communications can be achieved by using the existing touch panel instead of the NFC related components and technology. Therefore, the cost of manufacturing the electronic device can be reduced. In addition, in the embodiment of the invention, by flexibly adjusting the effective communications range via the plurality of methods as discussed above, the data transmission, the essential information for establishing a wireless communications link exchange, and the wireless communications link establishment can only be performed under secure conditions (for example, when the two electronic devices are located within the effective communications range). In this manner, the security of the communications can be greatly improved.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device with touch-link functionality, comprising:
   a touch panel, comprising a first transmitting electrode for transmitting a first signal;
   a signal processing circuit, providing the first signal to the first transmitting electrode, wherein the first signal has a first frequency that is adjustable; and
   a controller, coupled to the touch panel and the signal processing circuit, adjusting the first frequency to make the first signal correspond to an effective communications range, wherein within the effective communications range, another electronic device with touch-link functionality is able to receive the first signal, whereas outside the effective communications range, the another electronic device with touch-link functionality is unable to receive the first signal;
   wherein the touch panel is further configured for receiving a second signal transmitted by the another electronic device; wherein the signal processing circuit is further configured for demodulating the second signal according to another receiving frequency, wherein the another receiving frequency is adjustable,
   wherein the controller determines the frequency of the first signal according to the effective communications range by: determining a plurality of different test frequencies according to the effective communications range; transmitting the first signal at the plurality of different test frequencies in turn in a test phase; and selecting at least one from the one or more preferred frequencies as the frequency of the first signal,
   wherein the first signal is received by a touch panel of the another electronic device and demodulated according to the plurality of different test frequencies by the another electronic device; wherein one or more preferred frequencies is selected from the plurality of different test frequencies according to strength of the first signal or suffered interference of the first signal by the another electronic device; and wherein information regarding the one or more preferred frequencies is transmitted to the first electronic device via the second signal by the another electronic device.

2. The electronic device as claimed in claim 1, wherein the touch panel further comprises a first receiving electrode receiving the second signal.

3. The electronic device as claimed in claim 2, wherein the first transmitting electrode and the first receiving electrode are further utilized for detecting touch events on the touch panel.

4. The electronic device as claimed in claim 2, wherein the touch panel further comprises a second receiving electrode receiving a fourth signal, wherein the signal processing circuit further receives the fourth signal from the second receiving electrode and demodulates the fourth signal, and wherein the fourth signal has a fourth frequency that is variable, and wherein the controller selectively activates the first receiving electrode or the second receiving electrode, or simultaneously activates the first receiving electrode and the second receiving electrode.

5. The electronic device as claimed in claim 1, wherein the touch panel further comprises: a second transmitting electrode, transmitting a third signal, wherein the third signal has a third frequency that is adjustable, and the controller activates one of the first transmitting electrode and the second transmitting electrode, or simultaneously activates the first transmitting electrode and the second transmitting electrode.

6. The electronic device as claimed in claim 1, wherein the controller further transmits a fifth signal via the first transmitting electrode before the first transmitting electrode transmits the first signal, and determines a value of the first frequency according to strength of the fifth signal received by the first receiving electrode, wherein the fifth signal is transmitted at a plurality of different frequencies in turn.

7. The electronic device as claimed in claim 1, further comprising;
a wireless communications module, providing wireless communications functionality,
wherein the controller further transmits information via the first signal to another electronic device with touch-link functionality, and the wireless communications module establishes a wireless communications link with the another electronic device according to the information.

8. An electronic device with touch-link functionality, comprising:
a touch panel, comprising a first receiving electrode receiving a first signal from another electronic device with touch-link functionality, wherein the first signal has a first frequency that is variable and the first signal corresponds to an effective communications range;
a signal processing circuit, receiving the first signal from the first receiving electrode and demodulating the first signal according to a receiving frequency; and
a controller, coupled to the touch panel and the signal processing circuit and adjusting the receiving frequency to correspond to the first frequency;
wherein within the effective communications range, the first receiving electrode is able to receive the first signal, whereas outside the effective communications range, the first receiving electrode is unable to receive the first signal;
wherein the touch panel is further configured for transmitting a second signal, wherein a frequency of the second signal is adjustable; wherein the second signal is received by the another electronic device via a touch panel of the another electronic device; wherein the another electronic device demodulates the second signal according to another adjustable receiving frequency, wherein the another electronic device determines the frequency of the first signal according to the effective communications range by: determining a plurality of different test frequencies according to the effective communications range; and transmitting the first signal at the plurality of different test frequencies in turn in a test phase; wherein the another electronic device selects at least one from the one or more preferred frequencies as the frequency of the first signal
wherein the touch panel is further configured for receiving the first signal;
wherein the signal processing circuit is further configured for demodulating the first signal according to the plurality of different test frequencies and for selecting one or more preferred frequencies from the plurality of different test frequencies according to strength of the first signal or suffered interference of the first signal; and
wherein the touch panel is further configured for transmitting information regarding the one or more preferred frequencies to the another electronic device via the second signal.

9. The electronic device as claimed in claim 8, wherein the touch panel further comprises a first transmitting electrode for transmitting the second signal.

10. The electronic device as claimed in claim 9, wherein the touch panel further comprises a second transmitting electrode transmitting a fourth signal, wherein the fourth signal has a fourth frequency that is adjustable, and wherein the controller selectively activates the first transmitting electrode or the second transmitting electrode, or simultaneously activates the first transmitting electrode and the second transmitting electrode.

11. The electronic device as claimed in claim 9, wherein the controller further transmits a fifth signal via the first transmitting electrode before the first receiving electrode receiving the first signal, and determines a value of the first frequency according to strength of the fifth signal received by the first receiving electrode, wherein the fifth signal is transmitted at a plurality of different frequencies in turn.

12. The electronic device as claimed in claim 8, wherein the touch panel further comprises a second receiving electrode receiving a third signal, wherein the signal processing circuit further receives the third signal from the second receiving electrode and demodulates the third signal, wherein the third signal has a third frequency that is variable, and wherein the controller activates one of the first receiving electrode and the second receiving electrode, or simultaneously activates the first receiving electrode and the second receiving electrode.

13. The electronic device as claimed in claim 8, further comprising:
a wireless communications module, providing wireless communications functionality,
wherein the controller further receives information via the first signal from another electronic device with touch-link functionality, and the wireless communications module establishes a wireless communications link with the another electronic device according to the information.

14. A method for establishing a wireless communications link between two electronic devices, comprising:
    setting an effective communications range, wherein within the effective communications range, a first electronic device is able to wirelessly communicate with the another electronic device with a touch panel by transmitting a first signal, whereas outside the effective communications range, the first electronic device is unable to wirelessly communicate with the another electronic device;
    determining a frequency of the first signal according to the effective communications range, wherein the frequency of the first signal is adjustable;
    transmitting the first signal by the first electronic device via a touch panel of the first electronic device;
    receiving the first signal by a second electronic device within the effective communications range via a touch panel of the second electronic device;
    demodulating the first signal by the second electronic device according to a receiving frequency, wherein the receiving frequency is adjustable;
    transmitting a second signal by the second electronic device via the touch panel of the second electronic device, wherein a frequency of the second signal is adjustable;
    receiving the second signal by the first electronic device via the touch panel of the first electronic device; and
    demodulating the second signal by the first electronic device according to another receiving frequency, wherein the another receiving frequency is adjustable,
    wherein the step of determining the frequency of the first signal according to the effective communications range further comprises:
        determining a plurality of different test frequencies according to the effective communications range;
        transmitting the first signal at the plurality of different test frequencies in turn in a test phase by the first electronic device;
        receiving the first signal by the touch panel of the second electronic device and demodulating the first signal according to the plurality of different test frequencies by the second electronic device;
        selecting one or more preferred frequencies from the plurality of different test frequencies according to strength of the first signal or suffered interference of the first signal by the second electronic device;
        transmitting information regarding the one or more preferred frequencies to the first electronic device via the second signal by the second electronic device; and
        selecting at least one from the one or more preferred frequencies as the frequency of the first signal by the first electronic device.

15. The method as claimed in claim 14, wherein the first signal is transmitted from the first electronic device to the second electronic device via a human body.

16. The method as claimed in claim 14, further comprising:
    determining a dielectric constant of the touch panel of the first electronic device or a dielectric constant of the touch panel of the second electronic device according to the effective communications range.

17. The method as claimed in claim 14, wherein when size of data is smaller than or equal to a threshold value, the method further comprises:
    transmitting the data to the second electronic device via the first signal by the first electronic device, and when the size of the data exceeds the threshold value, the method further comprises:
        transmitting information for establishing a wireless communications link to the second electronic device via the first signal by the first electronic device;
        establishing a wireless communications link between the first electronic device and the second electronic device according to the information; and
        transmitting the data to the second electronic device via the wireless communications link by the first electronic device.

18. The method as claimed in claim 14, wherein when a data rate of data is smaller than or equal to a threshold value, the method further comprises:
    transmitting the data to the second electronic device via the first signal by the first electronic device, and when the data rate of the data exceeds the threshold value, the method further comprises:
        transmitting information for establishing a wireless communications link to the second electronic device via the first signal by the first electronic device;
        establishing a wireless communications link between the first electronic device and the second electronic device according to the information; and
        transmitting the data to the second electronic device via the wireless communications link by the first electronic device.

* * * * *